US009461315B2

(12) United States Patent  (10) Patent No.: US 9,461,315 B2
Geneston  (45) Date of Patent:  Oct. 4, 2016

(54) PRESSURE-REGULATING DEVICE FOR A SYSTEM OF FUEL-CELL STACKS

(75) Inventor: Thierry Geneston, Cavaillon (FR)

(73) Assignee: AREVA STOCKAGE D'ENERGIE, Aix en Provence (FR)

( * ) Notice: Subject to any disclaimer, the term of this patent is extended or adjusted under 35 U.S.C. 154(b) by 559 days.

(21) Appl. No.: 13/979,498

(22) PCT Filed: Jan. 12, 2012

(86) PCT No.: PCT/EP2012/050449
§ 371 (c)(1),
(2), (4) Date: Aug. 16, 2013

(87) PCT Pub. No.: WO2012/095495
PCT Pub. Date: Jul. 19, 2012

(65) Prior Publication Data
US 2013/0323618 A1  Dec. 5, 2013

(30) Foreign Application Priority Data
Jan. 14, 2011 (FR) ..................................... 11 50305

(51) Int. Cl.
*H01M 8/04* (2016.01)
(52) U.S. Cl.
CPC ..... *H01M 8/04089* (2013.01); *H01M 8/04395* (2013.01); *H01M 8/04753* (2013.01); *H01M 8/0438* (2013.01); *H01M 8/04104* (2013.01); *H01M 8/04388* (2013.01); *H01M 8/04432* (2013.01); *Y02E 60/50* (2013.01)
(58) Field of Classification Search
None
See application file for complete search history.

(56) References Cited

U.S. PATENT DOCUMENTS

| | | | |
|---|---|---|---|
| 2002/0094467 A1* | 7/2002 | Nonobe | H01M 8/04097 429/411 |
| 2003/0175567 A1 | 9/2003 | Willimowski et al. | |
| 2004/0081864 A1 | 4/2004 | Herrmann | |
| 2004/0137294 A1* | 7/2004 | Kolodziej | H01M 8/04089 429/444 |
| 2005/0186454 A1* | 8/2005 | Clingerman | H01M 8/04223 429/429 |
| 2007/0065711 A1* | 3/2007 | Gopal | H01M 8/04014 429/415 |
| 2010/0028726 A1* | 2/2010 | Coerlin | H01M 8/04089 429/444 |

FOREIGN PATENT DOCUMENTS

DE  10200058 A1  7/2003
JP  2005339847 A  12/2005

* cited by examiner

*Primary Examiner* — Ula C Ruddock
*Assistant Examiner* — Matthew Van Oudenaren
(74) *Attorney, Agent, or Firm* — Davidson, Davidson & Kappel, LLC

(57) ABSTRACT

A system of fuel-cell stacks is provided. The system includes fuel-cell stacks, a circuit for supplying each fuel-cell stack with an oxidizing fluid, a circuit for supplying each fuel-cell stack with a reducing fluid, and a pressure-regulating device fitted to the supply circuits so as to regulate the fluid pressure in each fuel-cell stack. The pressure-regulating device includes a first line for controlling the fluid pressure and a second line for passing the fluid, these two lines being placed in parallel between an upstream channel delivering fluid from a supply circuit and downstream channels connected to each fuel-cell stack. The first line comprises a first pressure regulator for regulating the pressure in an upstream portion of the first line depending on a pressure measured downstream of a second pressure regulator placed on the second line, and the second pressure regulator is capable of matching the pressure in the downstream portion of the second line to a reference pressure, measured in the downstream portion of the first line.

10 Claims, 4 Drawing Sheets

PRESSURE-REGULATING DEVICE FOR A SYSTEM OF FUEL-CELL STACKS

The present invention relates to a pressure-regulating device in a system of fuel-cell stacks of the type comprising at least one fuel-cell stack, a circuit for supplying each fuel-cell stack with an oxidizing fluid, and a circuit for supplying of the or each fuel-cell stack with a reducing fluid, each supply circuit including an upstream channel delivering fluid and at least one downstream channel for connecting to a fuel-cell stack, the pressure-regulating device equipping at least one supply circuit to regulate the fluid pressure in the or each fuel-cell stack.

BACKGROUND

Such a pressure-regulating device is designed to regulate the pressure in the anodic and cathodic channels of the cells making up the fuel-cell stacks of the fuel-cell stack system, so as to optimize the output of said fuel-cell stacks.

Such pressure regulating devices are known, for example from document US 2004/0081864. This document describes a system of fuel-cells comprising a pressure-regulating device inserted between a reservoir for a reducing fluid and a channel supplying fluid for an anodic compartment of a fuel-cell stack.

In order to regulate the pressure in the anodic and cathodic channels precisely, the pressure-regulating devices used are generally made up of solenoid valves. However, such devices are extremely expensive when they involve going from a high fluid flow rate, as in the case of systems of fuel-cell stacks comprising a large number of fuel-cell stacks connected in fluid parallel.

SUMMARY OF THE INVENTION

One aim of the invention is therefore to provide a pressure-regulating device that is less expensive.

To that end, the invention relates to a pressure-regulating device of the aforementioned type, characterized in that the pressure-regulating device comprises an upstream junction fluidly connecting the upstream channel of a first supply circuit to a first line for controlling the fluid pressure and a second line for passing the fluid, the first line including a first pressure regulator positioned between an upstream portion and a downstream portion of the first line, and the second line including a second pressure regulator positioned between an upstream portion and a downstream portion of the second line, the downstream portion of the second line being fluidly connected to the or each downstream channel of said first supply circuit, and in that:
- the pressure-regulating device comprises a sensor measuring the fluid pressure in the second line, downstream from the second pressure regulator, and the first pressure regulator is capable of regulating the pressure in the downstream portion of the first line as a function of the pressure at the pressure sensor, and in that
- the second pressure regulator is capable of matching the pressure in the downstream portion of the second line to a reference pressure, measured at a first measuring point in the downstream portion of the first line.

In specific embodiments of the invention, the pressure-regulating device according to the invention also comprises one or more of the following features, considered alone or according to any technically possible combination(s):

- the downstream portion of the first line is fluidly connected to the downstream portion of the second line, at a downstream junction;
- the pressure sensor is capable of measuring the fluid pressure downstream from the downstream junction;
- the downstream portion of the first line comprises a non-return device for preventing fluid from rising from the downstream junction toward the first pressure regulator;
- the downstream portion of the first line comprises a pressure-reducing device, to reduce the fluid pressure between the upstream and downstream of said device;
- the pressure-reducing device is positioned upstream from the non-return device;
- the first measuring point is placed upstream from the pressure-reducing device;
- the device includes at least one third pressure regulator, to regulate the pressure in the or each downstream channel of the second supply circuit, said third pressure regulator being capable of matching the pressure in the or each downstream channel of the second supply circuit to a second reference pressure measured at a second measuring point, situated downstream from the second pressure regulator;
- there is only one third pressure regulator, which is placed upstream from the or each downstream channel of the second supply circuit, the second measuring point being placed on the downstream portion of the second line;
- the device comprises a plurality of third pressure regulators, each third pressure regulator being positioned on a downstream channel of the second supply circuit, each second measuring point being placed on a downstream channel of the first supply circuit, said downstream channels supplying the same fuel-cell stack.

BRIEF DESCRIPTION OF THE DRAWINGS

Other features and advantages of the invention will appear upon reading the following description, provided solely as an example and done in reference to the appended drawings, in which.

DETAILED DESCRIPTION

It will be noted that hereafter, the terms "upstream" and "downstream" must be understood with respect to the direction of flow of the fluids through the various elements of the system of fuel-cell stacks 10.

Figure 1:
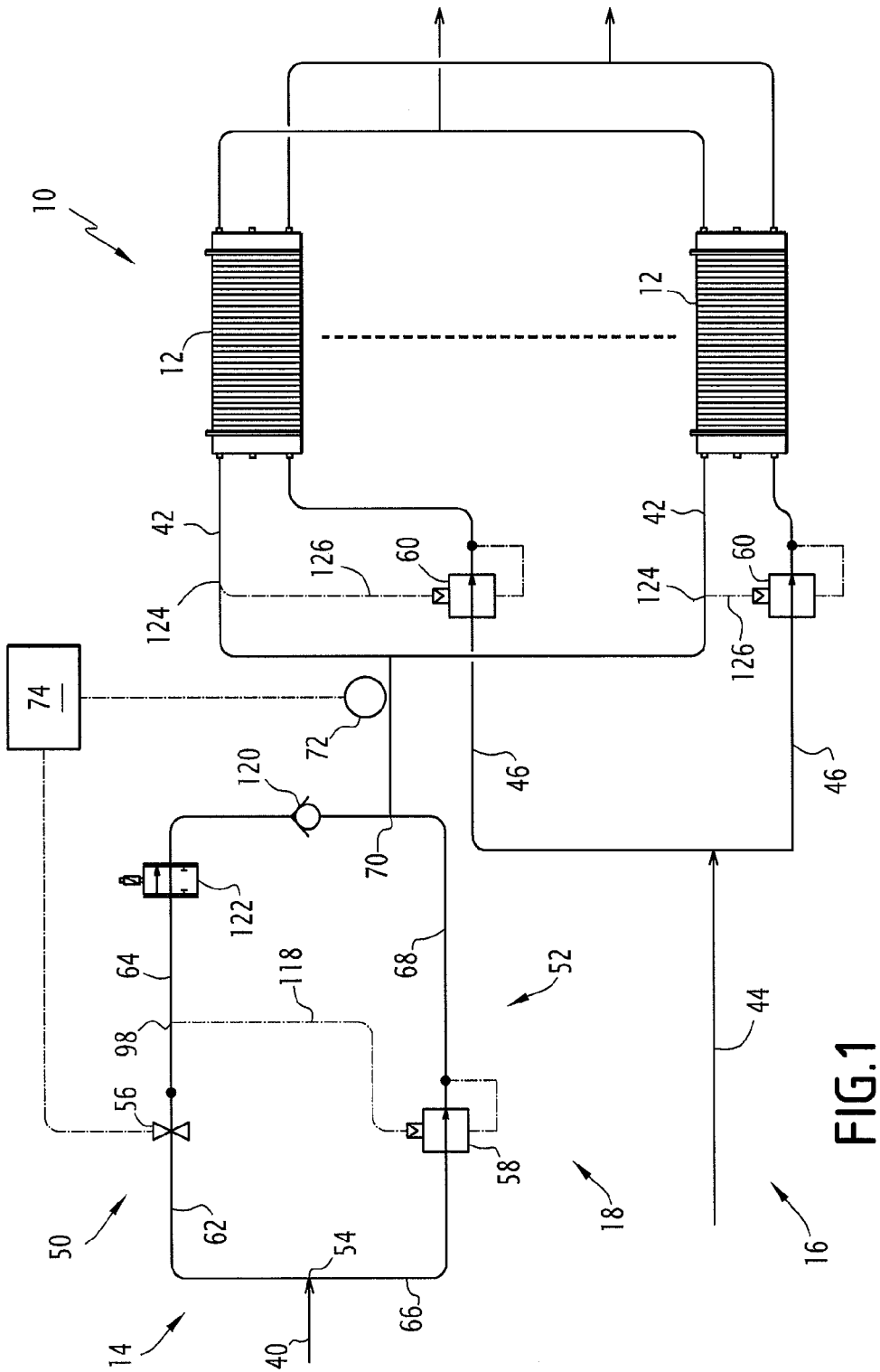
FIG. 1 is a diagram showing a system of fuel-cell stacks comprising a pressure-regulating device according to the invention.

The system of fuel-cell stacks 10, shown in FIG. 1, comprises a plurality of fuel-cell stacks 12, a circuit 14 for supplying the fuel-cell stacks 12 with an oxidizing fluid, a circuit 16 for supplying the fuel-cell stacks 12 with a reducing fluid, and a pressure-regulating device 18, to regulate the pressure of the oxidizing and reducing fluid in the fuel-cell stacks 12.

Each fuel-cell stack 12 is formed by a stack of several cells. One of those cells, referenced 20, is shown in FIG. 2.

Figure 2:
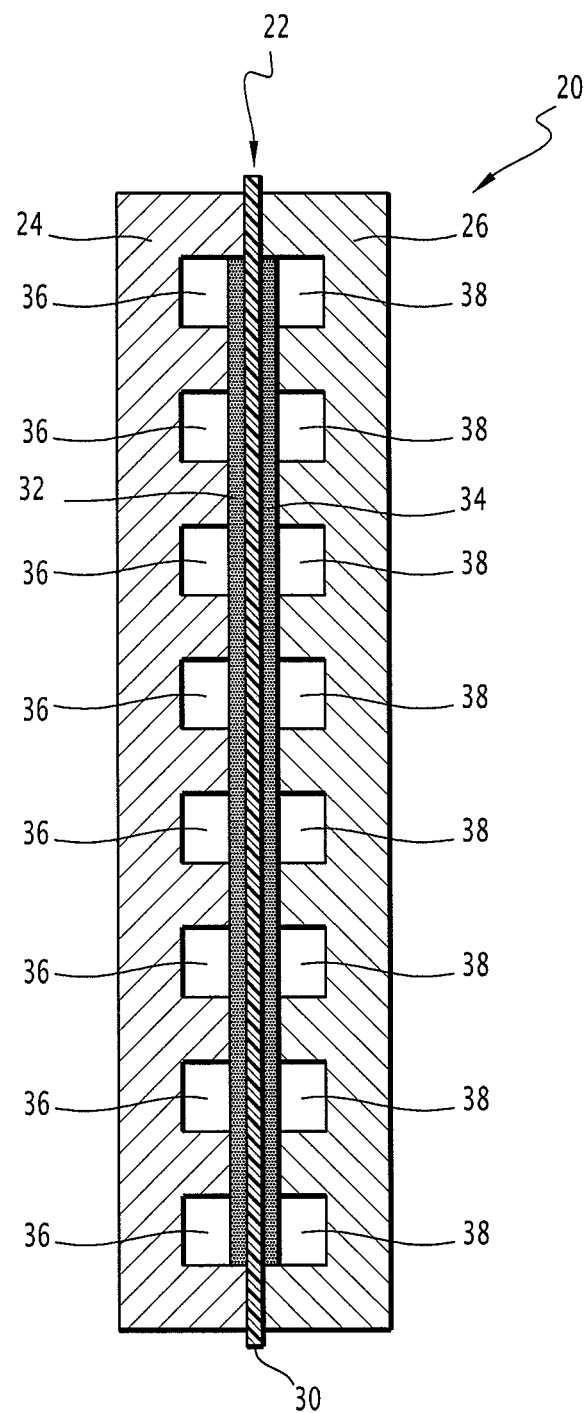
FIG. 2 is a diagrammatic cross-section of a cell of a fuel-cell stack of the system of FIG. 1.

As shown in FIG. 2, the cell 20 comprises a membrane-electrode assembly 22 inserted between an anode plate 24 and a cathode plate 26.

The membrane-electrode assembly 22 comprises an ion exchange membrane 30 sandwiched between an anode 32 and a cathode 34.

The membrane 30 electrically isolates the anode 32 from the cathode 34.

The membrane 30 is suitable for only allowing charged ions, preferably cations, to pass through it. The membrane 30 is generally a proton exchange membrane, suitable for only allowing protons to pass through it. The membrane 30 is typically made from a polymer.

The anode 32 and the cathode 34 each comprise a catalyst, typically platinum or a platinum alloy, to facilitate the reaction.

The anode plate 24 delimits an anode channel 36 for the circulation of a reducing fluid along the anode 32 and in contact therewith. To that end, the plate 24 is provided with at least one duct formed in the face of the plate turned toward the membrane-electrode assembly 24 and closed by said membrane-electrode assembly 22. The anode plate 24 is formed from an electrically conductive material, typically graphite or a graphite-based composite. The reducing fluid used is typically a fluid comprising hydrogen atoms, for example such as pure dihydrogen or methane.

The cathode plate 26 delimits a cathode channel 38 for circulating an oxidizing fluid along the cathode 34 and in contact therewith. To that end, the plate 26 is provided with at least one duct formed in the face of the plate turned toward the membrane-electrode assembly 22 and closed by said membrane-electrode assembly 22. The cathode plate 26 is made from an electrically conductive material, typically graphite or a graphite-based composite. The oxidizing fluid used is typically a fluid comprising dioxygen, for example such as pure dioxygen or air.

The membrane 30 separates the oxidizing and reducing fluids. It is positioned between the anode plate 24 and the cathode plate 26 of the cell 20 and electrically isolates them from each other.

It is at this level of the anode 32 that the oxidation of the reducing fluid occurs and the electrons and protons are generated. The electrons then pass through the anode plate 24 toward the cathode 34 of the cell 20, or toward the cathode of another cell, to participate in the reduction of the oxidizing fluid.

In the fuel-cell stacks 12, the anode plate 24 of each cell is in contact with the cathode plate 26 of the neighboring cell.

Returning to FIG. 1, the circuit 14 for supplying the fuel-cell stacks 12 with oxidizing fluid includes an upstream channel 40 for delivering oxidizing fluid and a plurality of downstream channels 42 connected to each fuel-cell stack 12. The upstream 40 and downstream 42 channels are fluidly connected to each other, and each downstream channel 42 is fluidly connected to the cathode channels of the cells of a fuel-cell stack 12.

Likewise, the circuit 16 supplying the fuel-cell stacks 12 with reducing fluid includes an upstream channel 44 delivering reducing fluid and a plurality of downstream channels 46 connected to each fuel-cell stack 12. The upstream 44 and downstream 46 channels are fluidly connected to each other, and each downstream channel 46 is fluidly connected to the anode channels of the cells of a fuel-cell stack 12.

The pressure-regulating device 18 equips each of the circuits supplying oxidizing fluid 14 and reducing fluid 16. It comprises a first line 50 for controlling the fluid pressure, a second line 52 for passing the fluid, fluidly connected to each downstream channel 42 of the circuit 14 supplying oxidizing fluid, an upstream junction 54 fluidly connecting the upstream channel 40 of the supply circuit 14 to the first 50 and second 52 lines, and a plurality of pressure regulators 56, 58, 60.

The first line 50 includes a first pressure regulator 56 positioned between an upstream portion 62 and a downstream portion 64 of the first line 50. The second line 52 includes a second pressure regulator 58 positioned between an upstream portion 66 and a downstream portion 68 of the second line 52.

The upstream portion 62 of the first line 50 and the upstream portion 66 of the second line 52 are fluidly connected to each other at the upstream junction 54. The downstream portion 64 of the first line 50 and the downstream portion 68 of the second line 52 are fluidly connected to each other at a downstream junction 70.

The pressure-regulating device 18 comprises a pressure sensor 72 for measuring the fluid pressure downstream from the second pressure regulator 58. In particular, the pressure sensor 72 is positioned on the downstream part 68 of the second line 52, downstream from the downstream junction 70, to measure the pressure downstream of said junction 70. The first pressure regulator 56 is capable of regulating the pressure in the downstream portion 64 of the first line as a function of the pressure measured by said pressure sensor 72.

To that end, the pressure-regulating device 18 comprises a control module 74 for controlling the first pressure regulator 56 as a function of the pressure measured by the pressure sensor 72. The first pressure regulator 56 is typically a solenoid valve and the control module 74 is suitable for commanding the opening and closing of the solenoid valve 56 as a function of the pressure measured by the pressure sensor 72.

Figure 3:
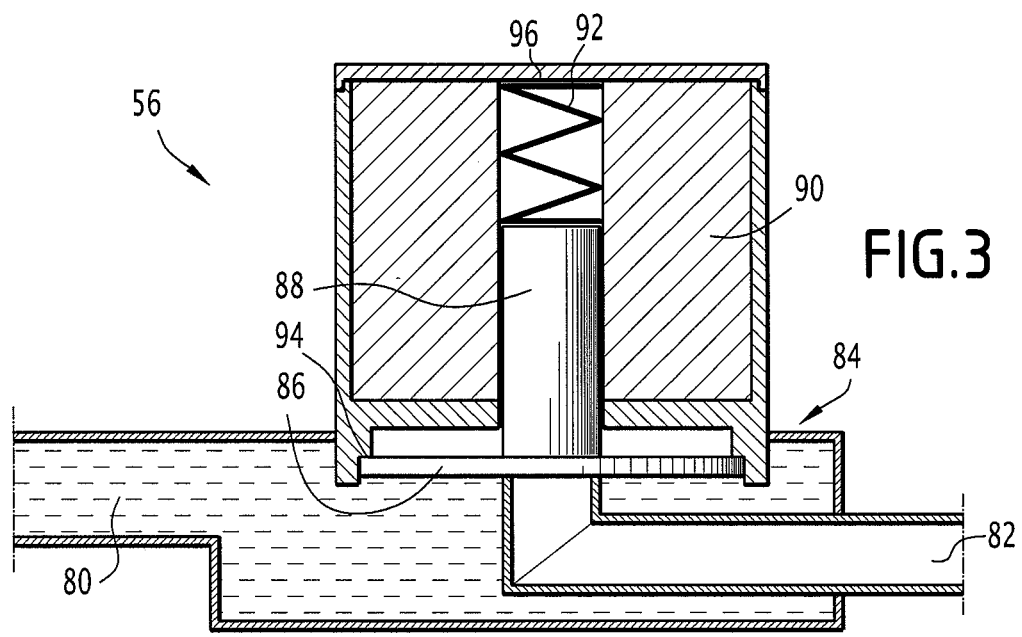
FIG. 3 is a diagrammatic cross-section of a first pressure regulator of the pressure-regulating device of FIG. 1.

One example embodiment of the solenoid valve 56 is shown in FIG. 3.

As shown in FIG. 3, the solenoid valve 56 comprises a first fluid inlet 80, fluidly connected to the upstream portion 62 of the first line 50, a first fluid outlet 82, fluidly connected to the downstream portion 64 of the first line 50, and a first device 84 for putting the first inlet 80 in fluid communication with the first outlet 82, controlled by the control module 74.

The first fluid communication device 84 comprises a membrane 86, a metal strip 88, attached to the center of the membrane 86, a solenoid 90, extending around the strip 88, and a return device 92.

The membrane 86 is made from a fluid-tight material. It is fastened, for example glued, along its edges, to a seat 94. It has a certain degree of elasticity.

The strip 88 is made from a magnetic material. It extends inside a cavity 96 that is elongated in a longitudinal direction. The strip 88 is capable of moving longitudinally in the cavity 96 between an idle position, in which the membrane 86 covers the first outlet 82, and a fluid communication position, in which the membrane 86 is separated from the first outlet 82, and the first inlet 80 and the first outlet 82 are in fluid communication.

In FIG. 3, the strip 88 is shown in its idle position.

The return device 92 is capable of exerting a return force on the strip 88, so as to return it to its idle position. The return device is typically a spring.

The solenoid 90 extends around the cavity 96. It is capable of generating a magnetic field under the effect of electrical current traveling through it, so as to move the strip 88 from its idle position toward its fluid communication position. The control module 74 is capable of controlling the current passing through the solenoid 90.

A ball or any other suitable device for closing the first outlet 82 may be substituted for the membrane 86.

Returning to FIG. 1, the second pressure regulator 58 is capable of matching the pressure in the downstream portion 68 of the second line 52 to the first reference pressure, measured at a first measuring point 98 situated on the downstream portion 64 of the first line 50. "Match" means that, whatever the value of the first reference pressure, the pressure in the downstream portion 68 is an affine function, with a unitary slope, of the reference pressure. In other words:

$$\forall P_{ref1}, P_{L2} = P_{ref1} - \Delta P, \Delta P \in \Re^+$$

Where $P_{ref1}$ is the first reference pressure, $P_{L2}$ is the pressure in the downstream portion 68, and $\Delta P$ is said predetermined pressure differential. It will be noted that the pressure differential $\Delta P$ may be zero, and that the pressure in the downstream portion $P_{L2}$ is then equal to the reference pressure $P_{ref1}$.

The second pressure regulator 58 is preferably an expander.

Figure 4:
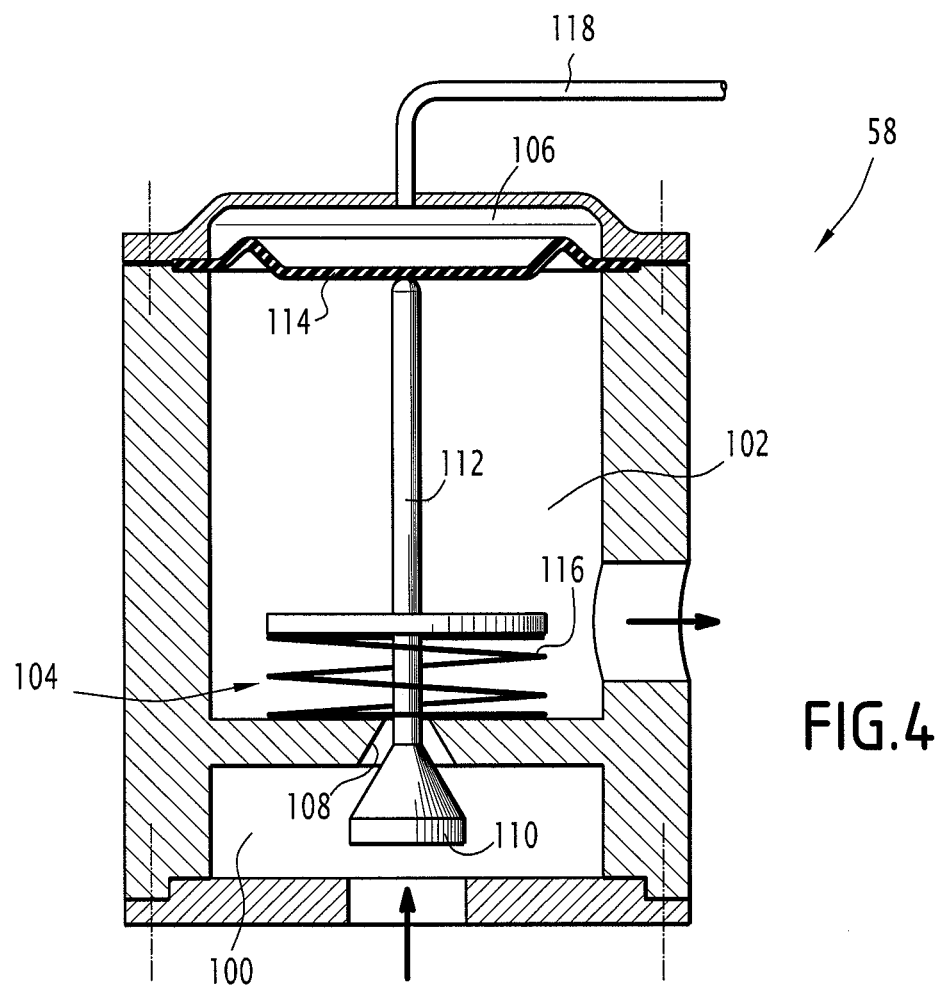
FIG. 4 is a diagrammatic cross-section of a second pressure regulator of the pressure-regulating device of FIG. 1.

One example embodiment of the expander 58 is shown in FIG. 4. As shown in that Figure, the expander 58 comprises a second fluid inlet 100, fluidly connected to the upstream portion 66 of the second line 52, a second fluid outlet 102, fluidly connected to the downstream portion 68 of the second line 52, a second device 104 for putting the second fluid inlet 100 in fluid communication with the second fluid outlet 102, and a fluid chamber 106.

The second fluid communication device 104 comprises a duct 108 connecting the second inlet 100 to the second outlet 102, and a device 110 for covering the duct 108, for example a ball, movable between a covering position, in which it covers the duct 108, and a fluid communication position, in which the device 110 is separated from the duct 108.

The device 110 is secured to a rod 112, which in turn is secured to the center of a membrane 114 separating the chamber 106 and the second fluid outlet 102.

The membrane 114 is fastened along its edges and is suitable for deforming as a function of the pressure difference existing between the fluid pressure in the chamber 106 and the fluid pressure in the second outlet 102.

A return device 116, typically a spring, is also provided to exert a return force on the rod 112, so as to counter the force exerted by the fluid from the chamber 106 on the membrane 114.

When the sum of the pressure in the second fluid outlet 102 and the pressure exerted by the return force on the membrane 114 is lower than the fluid pressure in the chamber 106, the membrane 114 is deformed toward the second outlet 102 and the coupling device 110 is in its fluid communication position. When the sum of the pressure in the second fluid outlet 102 and the pressure exerted by the return force on the membrane 114 is substantially equal to the fluid pressure in the chamber 106, the membrane 114 is deformed toward the chamber 106 and the covering device 110 is in its covering position.

The chamber 106 is fluidly connected, by means of a first measuring line 118, to the first measuring point 98. Thus, the fluid pressure in the chamber 106 is substantially equal to the first reference pressure.

Returning to FIG. 1, the downstream portion 64 of the first line 50 also comprises a non-return device 120, positioned between the downstream junction 70 and the first pressure regulator 56, and a pressure-reducing device 122, positioned upstream from the non-return device 120 and downstream from the first measuring point 98.

The non-return device 120 is typically a non-return valve. It is capable of preventing fluid from rising from the downstream junction 70 toward the first pressure regulator 56.

The pressure-reducing device 122 is capable of reducing the fluid pressure in the downstream part 64 of the first line 50, between the upstream and downstream of said device 122. The pressure-reducing device 122 is preferably a manual adjustment valve, or optionally a solenoid valve controlled by the control module 74. Alternatively, the pressure-reducing device 122 is a ring or diaphragm positioned in the downstream part 64 of the first line 50, to locally reduce the diameter of the cross-section of the downstream part 64.

The pressure-regulating device 18 also comprises a plurality of third pressure regulators 60, to regulate the reducing fluid pressure in each downstream channel 46 of the circuit 16 supplying reducing fluid. Each third pressure regulator 60 is capable of matching the pressure in the downstream channel 46 to a second reference pressure, measured at a second measuring point 124, situated downstream from the second pressure regulator 58.

The third pressure regulators 60 are preferably expanders similar to the expander 58.

As shown in FIG. 1, each third pressure regulator 60 is positioned on the downstream channel 46 of the supply circuit 16 and comprises a second measuring line 126, to measure the second reference pressure at a second measuring point 124 placed on a downstream channel 42 of the supply circuit 14 supplying the same fuel-cell stack 12 as that supplied by the downstream channel 46 on which the third pressure regulator 60 is positioned.

This solution allows a precise adjustment of the reducing fluid pressure in each fuel-cell stack 12 as a function of the oxidizing fluid pressure in the fuel-cell stack 12.

Figure 5:
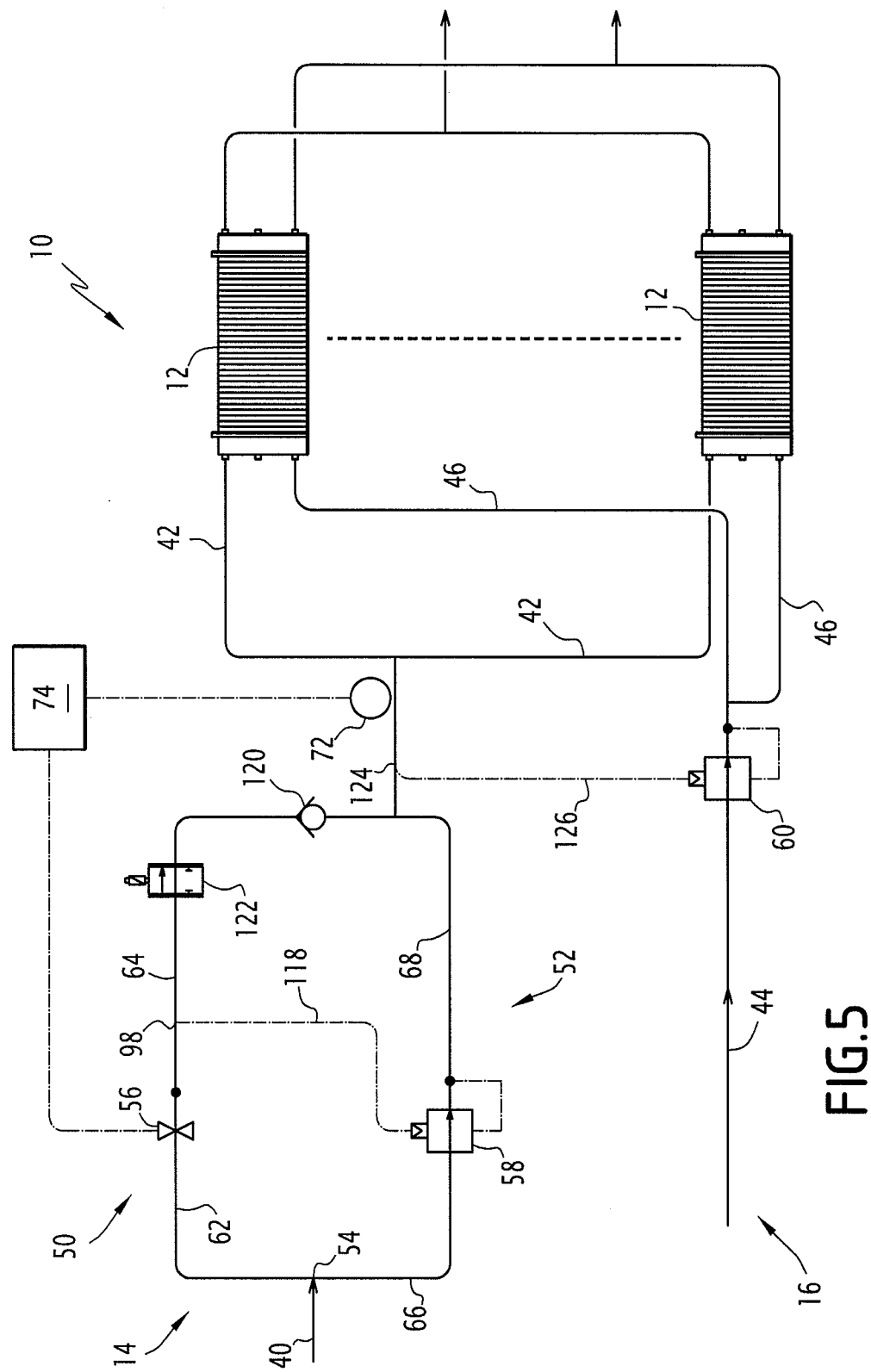
FIG. 5 is a diagram showing an alternative of the system of fuel-cell stacks of FIG. 1.

Alternatively, as shown in FIG. 5, the pressure-regulating device 18 comprises a single third pressure regulator 60. The latter is then placed upstream from the downstream channels 46 of the second supply circuit 16, on the upstream channel 44, and the second measuring point 124 is placed on the downstream portion 68 of the second line 52, preferably downstream from the downstream junction 70.

This alternative makes it possible to reduce the cost of the system, a single third pressure regulator being used to regulate the pressure in all of the fuel-cell stacks, instead of one third pressure regulator per fuel-cell stack.

One can thus easily see that, owing to this embodiment of the invention, the pressure-regulating device is particularly inexpensive. In fact, the fluid volume passing through the first line 50 is low, the majority of the fluid flow passing through the second line 52. It is thus possible to use only a solenoid valve with a low flow rate, which is inexpensive.

Furthermore, the other pressure regulators used in the pressure-regulating device are expanders, for which it is possible to achieve high flow rates a low-cost.

Furthermore, because the downstream portions of the first and second lines are fluidly connected, it is possible, in the depressurization phase of the fuel-cell stacks, as during the phases where the request for electrical power from the fuel-cell stacks is stopped or decreased, during which the pressure may temporarily become higher than the reference value, to recycle the fluid present in the first line by reinjecting it into the second line through the downstream junction.

Lastly, the pressure-reducing device makes it possible to compensate for the imperfections of the second pressure regulator 58, by reducing the pressure at the outlet of the first line such that the fluid pressure at the outlet of the first line is equal to the fluid pressure in the downstream portion of the second line.

It will be noted that, in the description provided above, the first and second lines 50, 52 are connected to the circuit 14 supplying oxidizing fluid and the third pressure regulators 60 are placed on the circuit 16 supplying reducing fluid. However, this feature is not limiting and, alternatively, the first and second lines 50, 52 may be connected to the circuit 16 supplying reducing fluid, the third pressure regulators 60 then being placed on the circuit 14 supplying oxidizing fluid.

Also alternatively, the pressure-regulating device 18 comprises two systems like the system formed by the first and second lines 50, 52, one system being connected to the circuit 14 supplying oxidizing fluid and the other system being connected to the circuit 16 supplying reducing fluid.

What is claimed is:

1. A pressure-regulating device in a system of fuel-cell stacks including at least one fuel-cell stack, a primary supply circuit for supplying each fuel-cell stack with an oxidizing fluid, and a secondary supply circuit for supplying each fuel-cell stack with a reducing fluid, each supply circuit including an upstream channel delivering fluid and at least one downstream channel for connecting to the at least one fuel-cell stack, the pressure-regulating device equipping at least one supply circuit to regulat the fluid pressure in the or each fuel-cell stack, the pressure-regulating device comprising:
   a first line for controlling the fluid pressure and a second line for passing the fluid;
   an upstream junction fluidly connecting the upstream channel of a first supply circuit among the primary and secondary supply circuits to the first line and the second line, the first line including a first pressure regulator positioned between an upstream portion and a downstream portion of the first line, and the second line including a second pressure regulator positioned between an upstream portion and a downstream portion of the second line, the downstream portion of the second line being fluidly connected to the or each downstream channel of the first supply circuit among the primary and secondary supply circuits; and
   a pressure sensor measuring the fluid pressure in the second line, downstream from the second pressure regulator, the first pressure regulator being capable of regulating the pressure in the downstream portion of the first line as a function of the pressure at the pressure sensor, the second pressure regulator being capable of matching the pressure in the downstream portion of the second line to a reference pressure, measured at a first measuring point in the downstream portion of the first line.

2. The pressure-regulating device as recited in claim 1 wherein the downstream portion of the first line is fluidly connected to the downstream portion of the second line, at a downstream junction.

3. The pressure-regulating device as recited in claim 2 wherein the pressure sensor is capable of measuring the fluid pressure downstream from the downstream junction.

4. The pressure-regulating device as recited in claim 2 wherein the downstream portion of the first line comprises a non-return device for preventing fluid from rising from the downstream junction toward the first pressure regulator.

5. The pressure-regulating device as recited in claim 4 wherein the downstream portion of the first line comprises a pressure-reducing device reducing the fluid pressure between the upstream and downstream of the pressure-reducing device.

6. The pressure-regulating device as recited in claim 5 wherein the pressure-reducing device is positioned upstream from the non-return device.

7. The pressure-regulating device as recited in claim 5 wherein the first measuring point is placed upstream from the pressure-reducing device.

8. The pressure-regulating device as recited in claim 1 further comprising at least one third pressure regulator regulating the pressure in the or each downstream channel of a second supply circuit among the primary and secondary supply circuit, the third pressure regulator being capable of matching the pressure in the or each downstream channel of second supply circuit to a second reference pressure measured at a second measuring point situated downstream from the second pressure regulator.

9. The pressure-regulating device as recited in claim 8 wherein there is only one third pressure regulator, which is placed upstream from the or each downstream channel of the second supply circuit, the second measuring point being placed on the downstream portion of the second line.

10. The pressure-regulating device as recited in claim 8 further comprising a plurality of third pressure regulators, each third pressure regulator being positioned on a downstream channel of the second supply circuit which supplies a respective fuel-cell stack said third pressure regulator being capable of matching a the pressure in said downstream channel of the second supply circuit to a second reference pressure measured at a second measuring point situated on a respective downstream channel of the first supply circuit which supplies said respective fuel cell stack.

* * * * *